(12) United States Patent
Holden

(10) Patent No.: US 8,368,243 B1
(45) Date of Patent: Feb. 5, 2013

(54) ROOFLINE CONDUIT FOR WIND GENERATOR

(76) Inventor: Harold H. Holden, Ardmore, OK (US)

(*) Notice: Subject to any disclaimer, the term of this patent is extended or adjusted under 35 U.S.C. 154(b) by 544 days.

(21) Appl. No.: 12/636,152

(22) Filed: Dec. 11, 2009

Related U.S. Application Data

(60) Provisional application No. 61/203,219, filed on Dec. 19, 2008.

(51) Int. Cl.
*F03D 9/00* (2006.01)

(52) U.S. Cl. .......................................................... 290/55

(58) Field of Classification Search ...................... 415/2.1
See application file for complete search history.

(56) References Cited

U.S. PATENT DOCUMENTS

| | | | | |
|---|---|---|---|---|
| 299,127 | A * | 5/1884 | Garrigus | ........................ 415/2.1 |
| 4,084,918 | A | 4/1978 | Pavlecka | |
| 4,127,356 | A | 11/1978 | Murphy | |
| 4,156,580 | A | 5/1979 | Pohl | |
| 4,161,370 | A | 7/1979 | Oppolzer | |
| 4,313,710 | A | 2/1982 | La Ferte | |
| 4,379,236 | A | 4/1983 | Inoue | |
| 4,382,190 | A | 5/1983 | Jacobson | |
| 4,422,825 | A | 12/1983 | Boswell | |
| 4,490,623 | A | 12/1984 | Goedecke | |
| 5,977,649 | A * | 11/1999 | Dahill | ............................ 290/55 |
| 6,043,565 | A * | 3/2000 | Les Strange | .................... 290/55 |
| 6,270,308 | B1 | 8/2001 | Groppel | |
| 6,765,309 | B2 * | 7/2004 | Tallal et al. | ..................... 290/55 |
| 7,821,153 | B2 * | 10/2010 | Gray | ................................ 290/55 |
| 8,258,646 | B2 * | 9/2012 | Oosterling | ....................... 290/55 |
| 2008/0112789 | A1 * | 5/2008 | Kelaiditis | ....................... 415/4.1 |

* cited by examiner

*Primary Examiner* — Vanessa Girardi
(74) *Attorney, Agent, or Firm* — Hall Estill et al.; Bill D. McCarthy

(57) ABSTRACT

A wind generator assembly for driving an electric generator having an inlet air riser having an upper end disposed to capture portions of roof level wind currents and a lower end. The lower end of the inlet air riser extends upward from and is in communication with an air box that houses a rotator assembly. An air inlet turret is mounted for rotation by roof currents to be directed to gather and pass a portion of the roof currents into the inlet air riser. The rotator assembly has a rotor supported on a support arbor that is rotated in a predetermined rotational direction by roof level wind currents. The support arbor is connectable to an electric power generator.

13 Claims, 4 Drawing Sheets

ROOFLINE CONDUIT FOR WIND GENERATOR

RELATED APPLICATIONS

This application claims domestic priority to U.S. Provisional Application No. 61/203,219 filed Dec. 19, 2008, entitled "Wind Generator For Roof Wind Currents."

BACKGROUND

In the past, wind power has been harnessed in widespread areas of useful work, such as transportation (sailing the oceans), fluid mechanics (14th century Dutch windmills drained delta lowlands) and food processing (grinding mills powered by windmills). In the United States, windmills have long dotted farmlands, converting wind energy to draw water from wells; and by the early 1930s windmills for electricity were in common use on such farms, largely where electricity power lines had not yet reached. Recent years has seen the establishment of commercially operated wind farms that produce electricity fed to electrical power grids.

While the conversion of the kinetic energy of wind currents to produce useful work as just mentioned, wind power has not seen the magnitude of efforts directed to develop other energy sources, such as the exploration and use of hydrocarbon fuel and nuclear power sources. However, recent years have seen increased attention and development efforts to make wind power conversion economically feasible.

The prior art is replete with wind generator motors, and there are increasing numbers of both commercial and domestic wind generators in use in this country. The technology has developed to a state of advance sophistication insofar as the mechanical and electrical designs go, but challenges remain in providing wind generators that are acceptable to society from both environmental and aesthetic concerns.

It is to this need that embodiments of the present invention are directed, providing wind power conversion for domestic and commercial applications.

SUMMARY

The present invention provides embodiments of a wind generator assembly for use to drive an electric generator. The wind generator assembly has an inlet air riser that is positioned so that the upper end thereof is disposed in proximity to the roof of a building structure to capture portions of roof level air currents. The lower end of the inlet air riser is connected to an air box that houses a rotator assembly.

An air inlet turret is mounted at the upper end of the air inlet riser and is rotatable by roof level air currents, an opening of the air inlet turret being positioned by wind currents to face into such currents to gather and pass a portion of the wind currents into the wind inlet riser.

The rotator assembly has a rotor supported on a support arbor that is rotated in a predetermined rotational direction by passing wind currents. The support arbor is connectable to an electric power generator.

The features and benefits that characterize embodiments of the present invention will be apparent upon a reading of the following detailed description and review of the associated drawings and appended claims.

DESCRIPTION OF THE INVENTION

Figure 1:
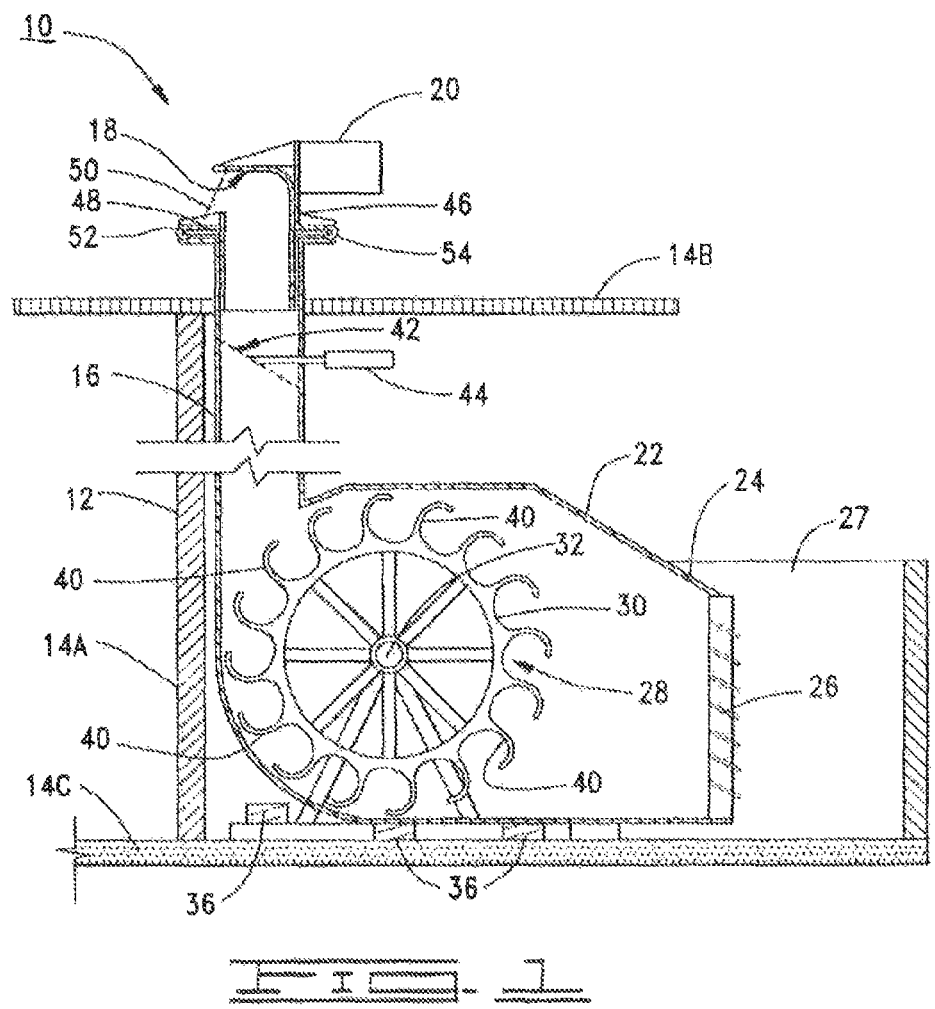
FIG. 1 is a semi-diagrammatical view of a wind generator constructed in accordance with embodiments of the present invention.
Figure 2:
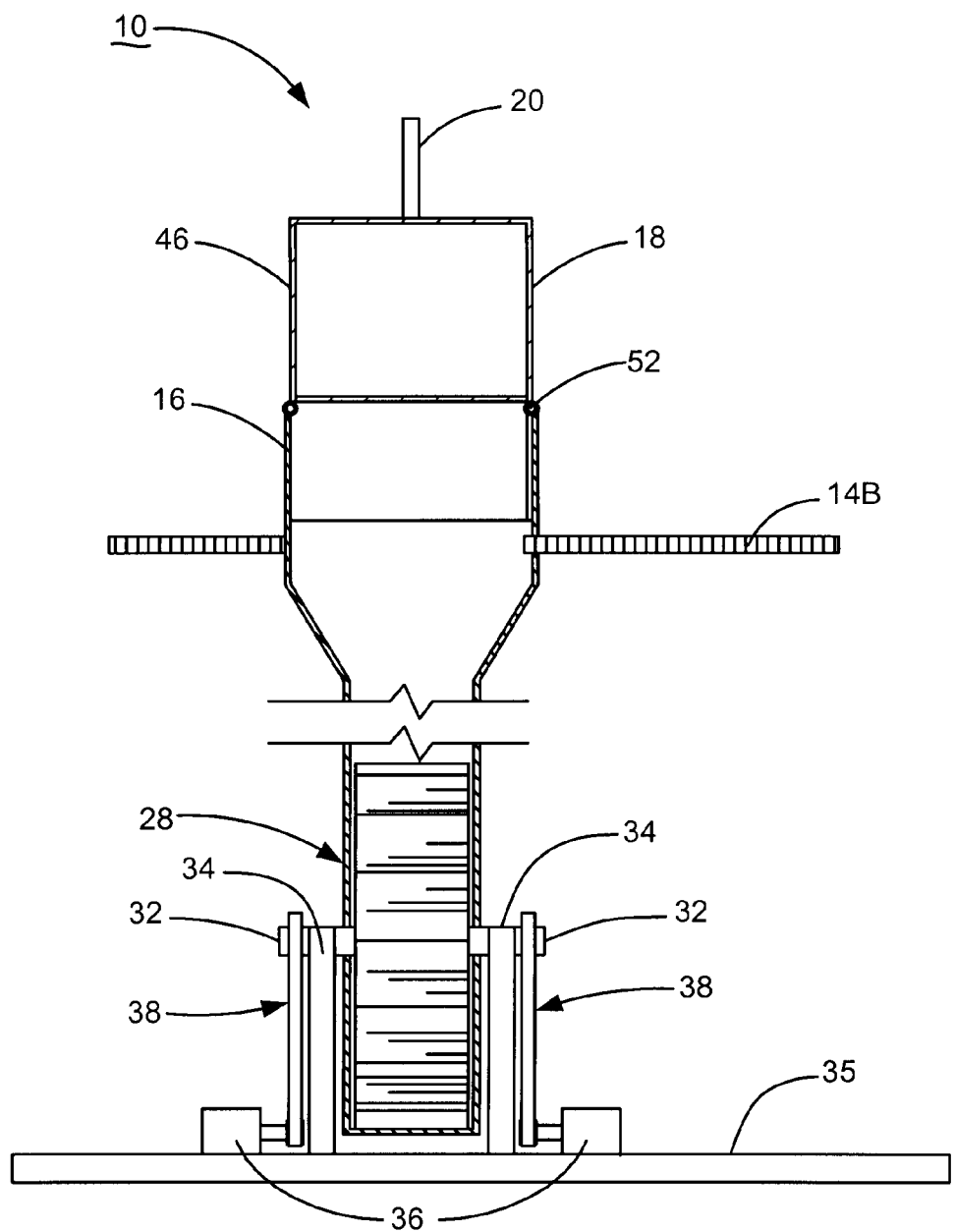
FIG. 2 shows a semi-detailed end view of the wind generator of FIG. 1.

As depicted in FIGS. 1 and 2, a wind generator assembly 10 is disposed in or near a building structure 12 having a vertical structure or wall 14A, a roof structure 14B and a foundation 14C. The wind generator assembly 10 can be located within the interior of the building structure or can be located external thereto. In the embodiment shown, the wind generator 10 is depicted within the structure 12, though only a portion of such structure is shown. It will be understood that certain details of construction, such as mechanical and electrical systems, are not herein described as the construction and installation of such will be obvious to one skilled in the art and need not be described in further detail to enable the practice of the embodiments of the present invention.

An inlet air riser 16, or wind intake conduit, extends from within the interior of the building structure 12 along the wall structure 14A and through an appropriately sized hole in the roof 14B (if external to the building structure, the inlet air riser 16 can extend along an outer wall to extend above the eave of the roof 14B). A rotary air intake turret 18 is supported at the upper end of the inlet air riser 16 to direct a portion of roof level wind currents into the inlet air riser 16. A directional vane 20, supported atop the air intake turret 18, serves to position the intake of the air intake turret 18 to be impinged by the wind currents.

The inlet air riser 16 communicates with an air box 22 through which high velocity wind currents pass to an air or wind outlet end 24 that preferably has a plurality of vent louvers 26. Preferably, a wind shield 27 is disposed a short distance from the outlet end 24 and extending as necessary about the outlet end 24 to prevent wind from back flowing into the air box 22. If desired, the wind shield 27 can be supported by, and attached to, the foundation 14C. The wind shield 27 can be shaped as may be required to direct the air current exhaust from the air box 22 in an environmentally friendly manner; that is, it may be desirable to direct the exhausting air stream from the air box 22 in an upward direction so that things located in close proximity will not be subjected to the force of the exhausting air stream.

Figure 3:
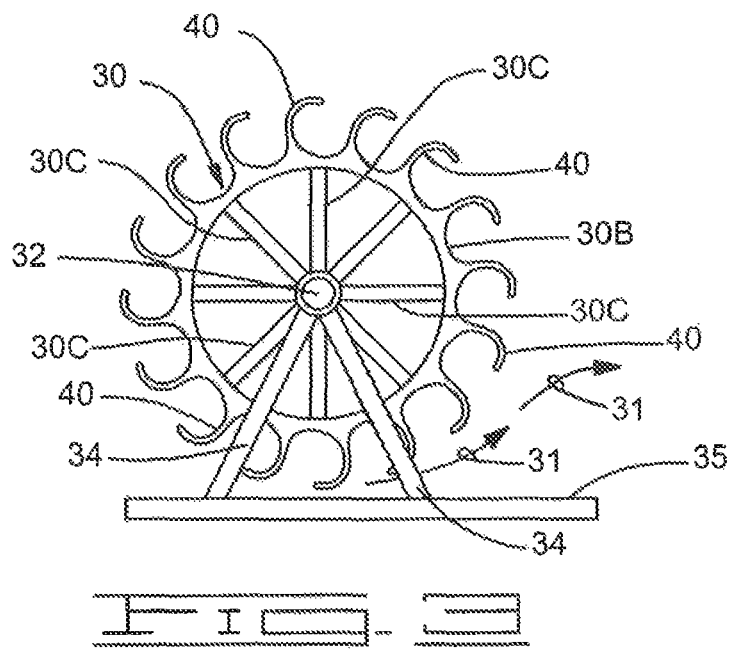
FIG. 3 is a view of the rotor of the wind generator of FIG. 1.
Figure 4:
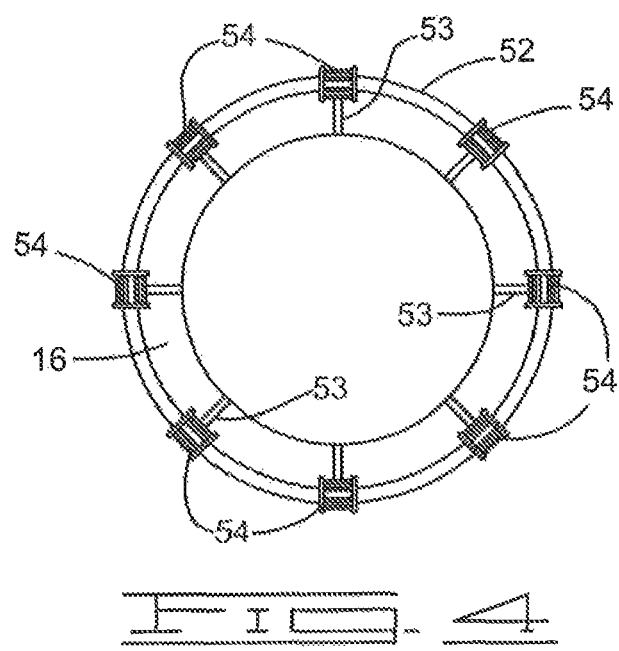
FIG. 4 is a plan view of the circular support rail of the wind generator of FIG. 1.

Set within and surrounded by the air box 22 is a rotor assembly 28. The rotor assembly 28 has a rotatable rotor 30 (best shown in FIG. 3) that has a center core member 30A and a plurality of spoke members 30C that extend radially to support a circular rim 30B. Extending outward from the circular rim 30B are a plurality of rotor bucket blades 40, the blades 40 preferably being curvilinearly shaped as depicted. Appropriating curtaining can be added, should such be necessary to minimize back drafting in the air box 22.

The rotor 30 is supported for rotation by a support arbor 32 (FIG. 2) that in turn is supported on appropriate bearings blocks (not separately numbered) that are supported on a yoke of upwardly extending, parallel support stanchions 34 supported on a base 35. In some installations it may be beneficial to include a clutch mechanism (not shown) attached to the support arbor 32 to restrict the rotation of the rotor 30 in one directional direction 31.

One or more shaft driven electric generators 36 are driven by sheave and belt assemblies 38 connected to the support arbor 32 (FIG. 2). There are many such electric generators available commercially, and the sheave and belt assemblies 38 should be appropriately sized to accommodate the generator to be driven thereby.

The rotor bucket blades 40, preferably distributed evenly about the circular rim 30B, are positioned such that high velocity wind passing through the inlet air riser 16 will impinge the blades 40 to rotate the rotor 30 as the directed wind stream passes through the air box 22 and out the outlet end 24. A hinged damper plate 42 is supported in the inlet air riser 16 as depicted, and an extendible cylinder of a damper motor assembly 44 is connected to the damper plate 42 for rotating and setting the damper plate 42 between an open mode and a closed mode whereby the opening of the inlet air riser 16 can be selectively moved between being fully open to being fully closed and to positions in between. An appropriate electrical or air control (not shown) of the damper motor 44 is provided as appropriate.

The air inlet turret 18 has a substantially cylindrically shaped body portion 46 with an air intake opening 48, an opening screen 50 extending over the air intake opening 48. The air intake opening 48 communicates with the inlet air riser 16. The directional vane 20 is supported atop the body portion 46. The rotatable air intake turret 18 includes a stationary circular rail 52 that extends about the body portion 46 and which can be supported either by the building structure 12 or by the inlet air riser 16 by support brackets 53 attached to upper end of the inlet air riser 16.

Figures 5, 5A:
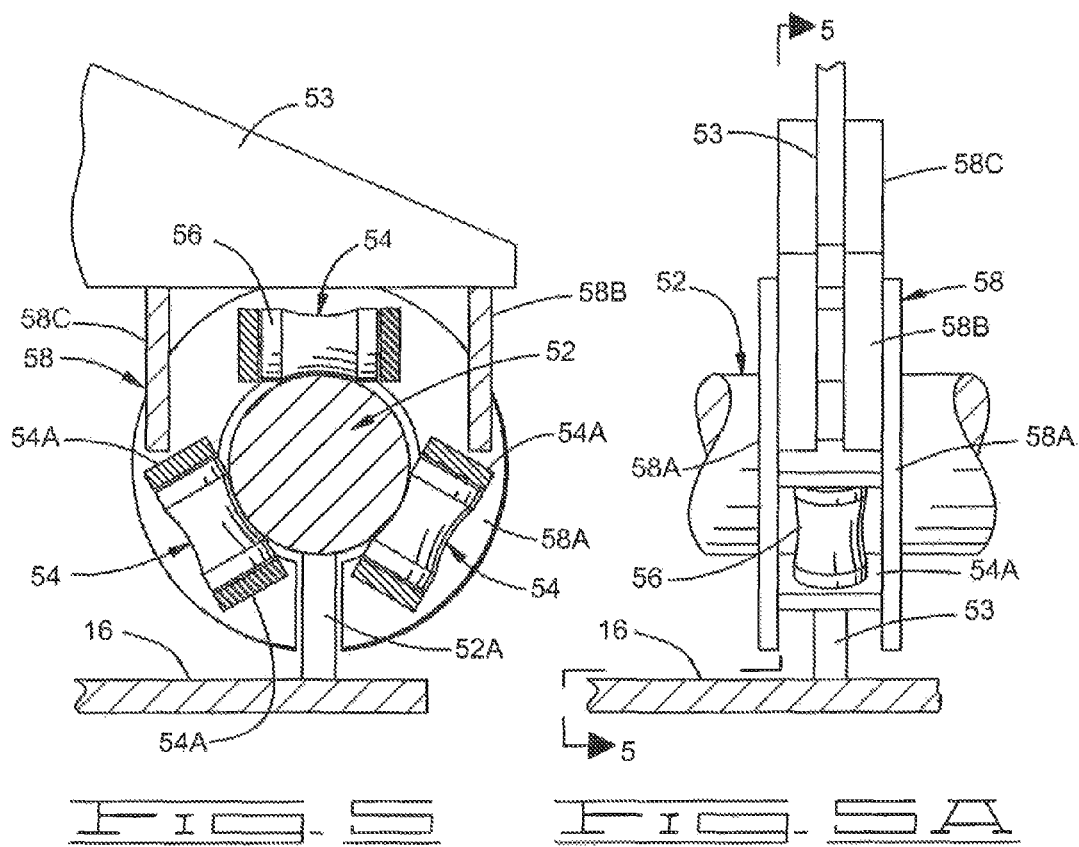
FIG. 5 is a partially detailed, enlarged view, in cross section taken at 5-5 in FIG. 5A, of the support rail of FIG. 4.
FIG. 5A is a partially detailed view taken at 5A-5A in FIG. 5.

A cross section of the circular rail 52 is shown in FIGS. 5 and 5A along with portions of one of the tri-roller assemblies 54 that secure the air intake turret 18 to the rail 52 for rotation about the top end of the inlet air riser 16. The rail 52 is supported by a plurality of spaced apart support posts 52A that are supported by, and extend upward from, the upper portion of the inlet air riser 16. The intake turret 18 is supported by and rotates on the rail 52 by means of a plurality of plate members 53 secured to, and extending radially from, the body portion 46. The plate members 53 serve to support generally circular shaped brackets 58 that in turn support a plurality of tri-roller assemblies 54 that engage the circular rail 52. Each bracket 58 has a pair of spaced apart circularly shaped plate members 58A (one of which is removed in FIG. 5) that are suspended from below one of the support plate 53 and secured thereto by a support posts 58B, 58C. Although only partially detailed, FIG. 5 shows that each tri-roller assembly 54 preferably comprises three rollers 56 angularly disposed and axially supported by support blocks 54A, to form a channel there between in which the rail 52 is disposed and grasped. The rollers 56 preferably are U-grooved wheels having a polyurethane outer sleeve supported by a steel support hub, such as available from Sunray, Inc.

The wind generator assembly 10, as depicted, provides several advantages over that known in the art of the energy capture and conversion of wind currents. It is generally acknowledged that people must advance the art of converting wind energy into electrical (or other usable) energy, but it seems to be a common objection that people do not want unsightly implements such as wind generators on their own property, often blocking pristine scenery (there have even been objections to off shore located wind generators, even when disposed miles from the shore line). Further, there have been objections that the rotating blades of wind generators are harmful to birds and other wildlife.

The wind generator assembly of the present invention (such as the preferred embodiment 10) can be mounted in a building structure (such as 12) or external to such building structure, having only an air intake portion (such as 18) visible from without and disposed in near proximity to the roof line of the building. The exposed intake portion (18) has means (such as directional vane 20 and the rotational support of the intake portion by the circular rail 52 and attaching tri-roller assemblies 54) to keep it facing into the prevailing wind currents passing over the roof structure (such as 14). The captured wind stream is directed (such as via the inlet air riser 16) to impinge upon and rotate a rotor (such as the bladed rotor 30) that in turn rotates a generator (such as by means of the sheave and belt assemblies 38 and generators 36), after which the air is directed to an exhaust opening (such as the outlet end 24 of air box 22).

Being substantially hidden from sight external to the building structure housing, the wind generator assembly of the present invention converts kinetic energy of a roof top wind current while maintaining the integrity of the surrounding environment. Further, as there is no interaction or interference with birds or wildlife, the wind generator assembly of the present invention preserves the integrity of its environmental settings.

It is clear that the present invention is well adapted to carry out the objects and to attain the ends and advantages mentioned as well as those inherent therein. While presently preferred embodiments of the invention have been described in varying detail for purposes of the disclosure, it will be understood that numerous changes may be made which will readily suggest themselves to those skilled in the art and which are encompassed within the spirit of the invention disclosed and as defined in the above text and in the accompanying drawings.

What is claimed is:

1. A wind generator assembly for driving an electric generator, comprising:
    an inlet air riser having an upper end and a lower end, the upper end disposed to capture portions of roof level wind currents;
    an air intake turret rotatably positioned in communication with the upper end of the inlet
    air riser to direct roof level wind currents to the inlet air riser, the air intake turret comprising:
    a body portion having an air intake opening;
    a rail having a circular profile; and
    at least one tri-roller assembly wherein each roller is substantially equally spaced around the rail profile and connecting the body portion to the rail, the body portion supported at the upper end of the inlet air riser, the air intake opening in communication with the air intake riser;
    an air box, the lower end of the inlet air riser in communication with the air box;
    a rotator assembly disposed in the air box, the rotator assembly having a rotor rotational by impingement of passing wind currents;
    means for operationally connecting the rotor and the electric generator.

2. The assembly of claim 1 wherein the rotor is supported for rotation in the air box, and wherein the air box has a wind outlet end from which the wind is exhausted.

3. The assembly of claim 2 further comprising:
    a damper plate supported in the inlet air riser; and
    a damper motor assembly for moving and setting the damper plate between an open mode and a closed mode.

4. The assembly of claim 3 wherein air intake turret has a screen positioned over the air intake opening of the body portion.

5. The assembly of claim 3 wherein the wind outlet end of the air box has a vent louver.

6. The assembly of claim 3 further comprising wind shield means for selectively directing the exhausting air current from the outlet end.

7. A wind generator assembly for a building assembly, comprising:

wind current capturing means for capturing portions of roof level wind currents;

a rotator assembly having a rotor rotational by impingement of passing wind currents;

conduit means for communicating with the wind current capturing means for directing the captured wind currents to rotate the rotor, the conduit means comprising an inlet air riser having an upper end disposed substantially at the level of the roof level wind currents;

an electric generator;

means for operationally connecting the rotor and the rotational electric generator;

the wind current capturing means comprising an air intake turret rotatably positioned in communication with the inlet air riser for directing roof level wind currents to the inlet air riser; and the air intake turret comprising:
a body portion having an air intake opening;
a rail having a circular profile; and
at least one tri-roller assembly wherein each roller thereof is substantially equally spaced around the rail profile connecting the body portion to the rail.

8. The assembly of claim 7 wherein the rotor is supported in an air box, and wherein the air intake riser has a lower end connected to the air box, the air box having a wind outlet end from which the wind is exhausted.

9. The assembly of claim 8 wherein the rotor has a plurality of rotor blades whereby the rotor is rotated in a rotational direction by roof wind currents.

10. The assembly of claim 9 further comprising:
a damper plate supported in the inlet air riser;
a damper motor assembly for moving and setting the damper plate between an open mode and a closed mode.

11. The assembly of claim 10 wherein air intake turret has a screen positioned over the air intake opening.

12. The assembly of claim 11 wherein the wind outlet end of the air box has a vent louver.

13. The assembly of claim 12 further comprising wind shield means for selectively directing the exhausting air current from the outlet end.

* * * * *